United States Patent
Müller et al.

(10) Patent No.: US 6,793,720 B2
(45) Date of Patent: Sep. 21, 2004

(54) SOLID MARKING COMPOSITION AS WRITING MEANS, A WRITING INSTRUMENT, AN OPTICALLY VARIABLE MARKING LAYER AND USE OF A PLURALITY OF OPTICALLY VARIABLE PIGMENTS

(75) Inventors: Edgar Müller, Fribourg (CH); Olivier Rozumek, St. Martin (CH)

(73) Assignee: SICPA Holding S.A., Prilly (CH)

( * ) Notice: Subject to any disclaimer, the term of this patent is extended or adjusted under 35 U.S.C. 154(b) by 0 days.

(21) Appl. No.: 10/239,182

(22) PCT Filed: Apr. 12, 2001

(86) PCT No.: PCT/EP01/04262

§ 371 (c)(1),
(2), (4) Date: Sep. 26, 2002

(87) PCT Pub. No.: WO01/79365

PCT Pub. Date: Oct. 25, 2001

(65) Prior Publication Data

US 2003/0056688 A1 Mar. 27, 2003

(30) Foreign Application Priority Data

Apr. 14, 2000 (EP) .............................................. 00810324

(51) Int. Cl.⁷ .............................................. C09D 13/00
(52) U.S. Cl. .............................. 106/31.07; 106/31.08; 106/31.61; 106/31.62; 106/31.63; 106/31.64; 106/420; 106/442; 106/449; 106/450; 106/461; 106/466; 106/482; 106/452; 106/419
(58) Field of Search .......................... 106/31.07, 31.08, 106/31.61, 31.62, 31.63, 31.64, 420, 442, 449, 450, 461, 466, 482, 452, 419; 283/114; 428/199, 916

(56) References Cited

U.S. PATENT DOCUMENTS

| | | | | |
|---|---|---|---|---|
| 3,926,659 A | * | 12/1975 | Bernhard et al. | 106/418 |
| 3,993,492 A | * | 11/1976 | Woolly | 106/31.09 |
| 4,952,245 A | * | 8/1990 | Iwano et al. | 106/404 |
| 5,059,245 A | | 10/1991 | Phillips et al. | |
| 5,733,364 A | | 3/1998 | Schmid et al. | |
| 5,851,604 A | | 12/1998 | Muller-Rees et al. | |
| 6,056,810 A | * | 5/2000 | Lugert | 106/31.09 |
| 6,514,446 B1 | * | 2/2003 | Smith et al. | 264/299 |
| 6,589,720 B2 | * | 7/2003 | Bourdelais et al. | 430/432 |
| 2001/0032570 A1 | * | 10/2001 | Horino et al. | 106/486 |
| 2003/0051634 A1 | * | 3/2003 | Takahashi | 106/403 |
| 2003/0087094 A1 | * | 5/2003 | Smith et al. | 428/402 |

FOREIGN PATENT DOCUMENTS

| | | |
|---|---|---|
| DE | 19820225 | 11/1999 |
| JP | 59174668 | 10/1984 |
| JP | 09078019 | 3/1997 |
| WO | WO 98/26017 | 6/1998 |

* cited by examiner

Primary Examiner—Mark L. Bell
Assistant Examiner—Veronica F. Faison
(74) Attorney, Agent, or Firm—Shoemaker and Mattare

(57) ABSTRACT

A solid marking composition comprises a solid matrix containing at least one type of optically variable interference pigment flakes. The solid marking composition provides a document or article with a copy and counterfeit protection feature, and is preferably used in a writing instrument for applying hand-written anti-counterfeit markings and signatures.

22 Claims, 2 Drawing Sheets

Figure 1:
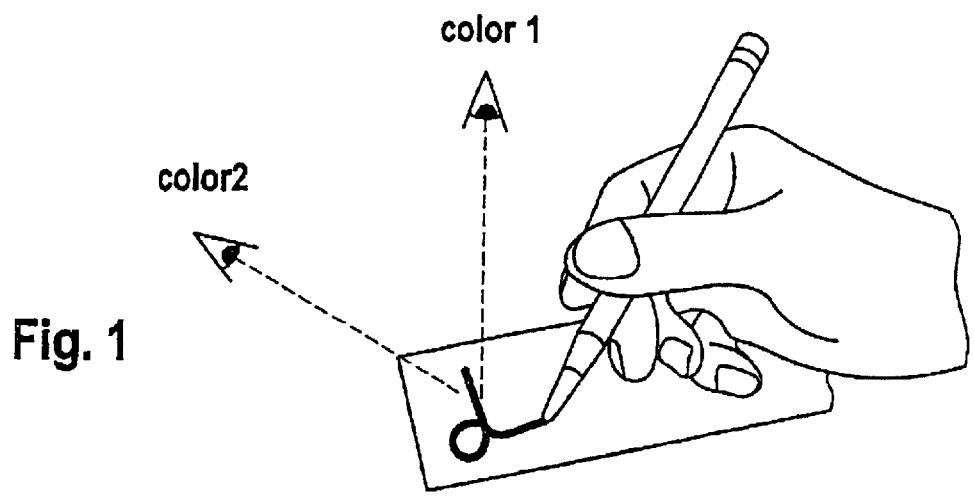

Upper figure: orthogonal view
Lower figure: grazing view

Horizontal scale: wavelength in [nm]
Vertical scale: reflectance in arbitrary units

SOLID MARKING COMPOSITION AS WRITING MEANS, A WRITING INSTRUMENT, AN OPTICALLY VARIABLE MARKING LAYER AND USE OF A PLURALITY OF OPTICALLY VARIABLE PIGMENTS

The present invention relates to a solid marking composition as writing means in a writing instrument, to a writing instrument comprising the solid marking composition, to an optically variable marking layer and to the use of a plurality of optically variable pigments according to the preamble of the independent claims. The solid marking composition of the present invention is particularly adapted for the application of hand-written markings to articles or documents which must be copy-protected or unambiguously marked as originals.

The fight against forgery of high value branded articles and against counterfeiting of currency or cheques has brought forward a large diversity of different security systems in the recent years. One of the most effective means especially for preventing unauthorized photocopying of documents is the application or incorporation of certain sections onto or in the document or article which exhibit a viewing angle dependent shift of color. This effect is producible by interference pigments. The pigments are either incorporated in the documents' bulk material or blended in a coating composition or printing ink which afterwards is applied on the document.

Optically variable pigments are principally based on an interference effect which takes place when light is reflected at a first and a second surface of a thin layer of a suitable dielectric material. The interference of the two reflected waves enhances the reflected intensity in certain domains of the visible spectrum and extinguishes it in others. As a consequence, said thin layer appears colored; the colors depend upon the difference in optical paths between the two reflected waves. As the optical path in said thin layer is viewing-angle dependent, the color appearance is viewing-angle dependent, too.

Pigments showing a viewing-angle dependent variation of color are usually of a flake like shape and can be of inorganic or organic or mixed nature. The pigment flakes can be produced in various well known ways, e.g.:

i) by physical vapour deposition techniques, thereby creating a sheet of superposed layers which are plane and parallel to each other. This is done on a suitable carrier which is detached or dissolved afterwards to leave the unsupported film. The film is reduced to pigment size;

ii) by wet or dry chemical deposition techniques, thereby depositing layers of materials having the desired physical parameters onto the surfaces of already existing particles (such as aluminum flakes, mica, etc.);

iii) by chemical polymerization processes where an extended sheet of helically arranged or similar liquid crystal material is hardened by UV irradiation and the resulting sheet is subsequently comminuted to pigment flakes. In this case the interference effect results from the periodic modulation of the refractive index in the arranged liquid crystal stack;

iv) by providing an all-polymer multi-layer sheet as described in U.S. Pat. No. 3,711,176, and comminuting it to pigment.

In the case of i) and ii) two basic design configurations are possible for the multi-layer interference stack. The first of the two designs can be characterized as an all-dielectric stack consisting of a periodic structure of alternating high and low index dielectric films. The other design type can be characterized as a metal-dielectric system and consists of a periodic structure of alternating partially transmitting, partially reflecting metal and dielectric layers on an almost totally reflecting opaque metal layer. This definition includes all designs based on the Fabry-Perot resonator principle. Whereas in all-dielectric designs the reflectance in a given high reflectance band increases with the number of periods, the highest reflectance of the metal-dielectric design is achieved already by a three layer stack: an opaque totally reflecting metal layer, a layer of a dielectric material arranged on top of the totally reflecting layer having an index of refraction preferably not exceeding 1.65 and, arranged on top the dielectric layer, a semi-transparent partially reflecting layer of a metal or metal oxide. For printing pigments, a symmetric structure having the sequence of dielectric and partially reflecting layer arranged on both of the surfaces of the opaque totally reflecting layer is preferred. Pigment flakes consisting of multi-layer structure of more than three (asymmetric design) respectively more than five superposed layers (symmetric design) have also been described in the state of the art and are applicable as well.

Coating compositions for producing a viewing-angle dependent variation of color by means of interference pigment flakes have been extensively described. However, they are all of a liquid and/or pasty consistency before application.

U.S. Pat. No. 5,059,245 and U.S. Pat. No. 5,171,363 disclose liquid printing inks comprising optically variable pigments of type i). U.S. Pat. No. 5,059,245 mentions as another alternative to incorporate the optically variable paint flakes in a plastic material which may then be cast, molded or extruded into a final article. In the context of the patent specification it is evident that said plastic material having incorporated optically variable pigment flakes is not meant as a means for coating other articles, but is itself considered the final article, which is colored by the incorporation of optically variable pigment flakes.

The same patent, U.S. Pat. No. 5,059,245, teaches that the aspect ratio of the optically variable pigment flakes is "important in that it helps to ensure that the flakes will land either on their top and bottom sides and not on their ends" and that "the ink should have good flow characteristics" in order to develop the required effect. From this, it is evident that the authors of U.S. Pat. No. 5,059,245 did not consider the possibility of creating an optically variable effect by the mere abrasion of a solid composition containing optically variable pigment. The aspect ratio is defined as the largeness-to-thickness ratio of the flakes.

Plastic sheets having incorporated optically variable pigment flakes of type i) have been described in U.S. Pat. No. 5,424,119. Those plastic sheets are produced by casting or extrusion of a bulk material in its thermoplastic state.

The fabrication and use of optically variable pigment of type ii) is described in EP 571 836, EP 668 329, EP 741 170 and EP 353 544. No application in solid-abrasion writing compositions is claimed.

Solid marking compositions comprising aluminum glitter pigments are known from U.S. Pat. No. 4,990,013. The aluminum pigments provide the layer produced therewith with a glitter effect. The glitter effect is the better pronounced, the more disordered the pigments are arranged in the layer. A disorderly arrangement provides a variety of planes and edges which reflect the incident light in a variety of different directions thereby producing the glitter effect. No optically variable appearance is produced.

The incorporation of pearlescent pigments, i.e. mica flakes coated with titanium dioxide, into solid-abrasion writing compositions, i.e. crayons, has been disclosed in JP 59174668 and JP 09078019. The aim of these patents was a marking material which develops a high reflective brightness and a lustrous color tone in particular on dark areas, remaining transparent on white areas. No substantial color shift is observed.

Pearlescent, or luster pigments, although they belong to the class of interference pigments, do not exhibit the strong angle-dependent color shifts which are observed with optically variable pigments. This is a direct consequence of their structure and of the impossibility to control their optical parameters: To obtain iridescent pigment, low-refractive-index (n=1.6) mica platelets having diameters of about 50 $\mu$m and thickness of about 1 $\mu$m are coated on both sides with a thin layer of high-refractive-index (n=2.0) titanium dioxide or similar materials. This results in a transparent, 3-layer interference stack, where part of the incident light is reflected at the top titanium dioxide layer, and part of it is reflected at the bottom titanium dioxide layer, interfering with the top-reflected light after having traveled twice through the dielectric mica layer.

The thickness of the mica platelets of the order of 1 $\mu$m results on one hand in a larger number—4 to 8—of interference maxima and minima throughout the visible range of the spectrum. Such an amount of spectral features does not result in a defined color. On the other hand, the thickness of the individual mica flakes cannot be precisely controlled, as mica is a mineral which is milled down to obtain the said flakes through the action of natural cleavage. Iridescent pigment is, in consequence, always a mixture of flakes having different spectral characteristics, and which, through the laws of additive mixing, together result in a white appearance.

As a consequence, titanium dioxide coated mica cannot be used as a color-generating pigment, nor as a color-shifting pigment. It allows, however, to obtain iridescent light reflection effects, in particular on dark backgrounds and at flat observation angles, said effects being useful for color-copy protection. The orientation of the iridescent pigment flakes on the final substrate is hereby not of preeminent importance; hence, for the skilled in the art, their application by the means of a solid-abrasion writing composition is to result in the desired effect.

U.S. Pat. No. 5,851,604 teaches the use of liquid crystal optically variable pigment flakes (type iii) in liquid coating compositions for producing optically variable color impression. Powder coating systems and incorporation of the flakes into bulk medium are disclosed as well.

U.S. Pat. No. 5,851,604 explicitly states the need, for obtaining the color effects described, to have the individual pigment flakes arranged "as uniformly as possible over relatively large surface areas, resulting in a homogenous spatial orientation of the helical axes." The authors teach that "the pigments can be oriented by methods in which shear forces are exerted. Examples of such orientation methods are spraying, knife coating, rolling, brushing, air brushing, sprinkling, dipping, flow coating, printing, casting, extrusion, blowing, calendering, dry coating, fluidized-bed sintering, triboelectric coating, electrostatic spraying, electrostatic coating, or lamination."

Solid-abrasion is not disclosed as a useful coating method for applying these optically variable pigments, and a closer look to the coating examples given in U.S. Pat. No. 5,851,604 reveals that all of them pass through a liquid state: Powder coating implies a baking step, where the binder is molten, allowing the pigment flakes to get oriented; knife-coating is done in a pasty state of the coating composition, whereby the pigment flakes are oriented by shear forces; plastic-molding implies as well a pasty state of the molding mass, where the pigment flakes are oriented by shear forces; casting allows for pigment orientation by natural effects, such as gravitational forces; in paint films, the flakes are oriented by capillary forces and surface tension; during lamination the thermoplastic binder melts, allowing for an orientation of the flakes; etc.

U.S. Pat. No. 5,851,604, enumerates also the use of liquid-crystal optically variable pigment in a variety of applications, among others "writing utensils". From the context it is clear, however, that the pigments are to be used to create color effects in a series of articles which are themselves final products (i.e. the writing utensil itself is colored with OVP); said articles are thus not considered as the means to create said color effects on other products (i.e. an OVP-crayon is not even implicitly comprised in said enumeration).

DE 198 20 225 A1 refers to another category of optically variable liquid-crystal pigments and claims compositions containing them. Again, the context of the disclosure is centered on liquid or pasty compositions, which are hardened after application. It does not even implicitly comprise application by solid-abrasion.

It is one drawback of the prior art that the production of layers, documents or images exhibiting a viewing-angle dependent variation of color requires time consuming processes and costly equipment, such as printing machines or extruders. The compositions are not adapted for quickly producing copy-protection markings such as signatures on single documents.

It was now highly surprisingly discovered that optically variable writings, i.e. such that exhibit substantial color shift with viewing angle, can successfully be obtained with solid-abrasion marking compositions, i.e. crayons, comprising optically variable pigment contained in a binder matrix which can be abraded in contact with a writing substrate, such as paper, fabric, wood, plastic metal, etc. Solid-state abrasion, against what one might intuitively think, apparently yields a sufficient alignment of the optically variable flakes on the substrate, as to result in a well-perceived and measurable angle-dependent color shift of the resulting writing.

In particular means and methods shall be provided for quickly applying anti-copy, anti-counterfeit or effect markings to a variety of documents. The application of the markings shall not require special know-how and shall not include costly equipment, time consuming preparation or special treatments of the layers after application.

The objects are solved by the features of the independent claims.

In particular they are solved by a solid marking composition as writing means in particular in a writing instrument for producing hand-written anti-counterfeit markings, comprising a solid matrix containing at least one type of optically variable interference pigment capable of producing a color-shift between two colors at first and second viewing angles.

As already described, the coating compositions comprising optically variable pigments disclosed in the prior art are without any exception of a liquid or of a pasty consistency. This consistency was deemed necessary to bring the flakes in a flat and parallel position with respect to each other and with respect to the surface of the underlying substrate. Three effects have been evoked responsible for the alignment of the flakes in said desired parallel position. 1) Right after the application of a liquid optically variable coating composition, gravitational forces are effective in directing the flakes parallel to the substrate surface (sedimentation). 2) This lay-down is enhanced by the surface tension, created by the draft of the solvent into the substrate and by the evaporation of the solvent (drying). The binder polymer furthermore tends to shrink and to pull the flakes flat. 3) A further alignment help for the pigment flakes can be achieved through a mechanical movement (draw-down), e.g. during bi-axial orientation of the film. Summarized, a liquid or pasty consistency of optically variable coating compositions or bulk materials prior to application was deemed absolutely necessary in the prior art to allow for alignment of the pigment flakes in a parallel position to each other and/or to the under-lying substrate, in order to obtain said viewing-angle dependent color variation of the features.

It has now surprisingly been found that layers produced on a substrate with the solid coating composition of the present invention exhibits a color-shift between two colors at first and second viewing angles, even though the coating composition is not of a liquid or of a pasty consistency and thus even without any of the mentioned alignment forces being effective. Seemingly, the lay-down of the optically variable pigment flakes on the substrate surface by mere abrasion from a crayon or pencil lead results in sufficient alignment for producing an angle-dependent color shift. This orientation of the flakes within the matrix on the substrate is improved by an aspect (i.e. largeness to thickness) ratio of the flakes of not less than 2:1, preferably of a ratio of greater than 5:1. That means that the flakes are (in average) five times larger (or wider) than thick. This assists in applying them substantially parallel to the surface of the substrate.

Contrary to the coating compositions of the prior art, the solid marking composition of the present invention does not form a film after being applied to the substrate. No inherent film forming processes like flowing and cross-linking take place after the application of the layer. In the context of the present invention the term layer stands for any image or marking applicable with the solid marking composition of the present invention. The terms film, film formation, film forming substances are defined according to the definition given in Römpp Lexikon, Lacke und Druckfarben, ed. U. Zorll, Georg Thieme Verlag, Stuttgart, 1998. The layer is formed by mere abrasion of the solid, pigmented matrix on the substrate. The solid matrix can be of any material with sufficient hardness to be handled, yet soft enough that abrasion of the material at reasonable pressure against the substrate (such as paper or fabric) will result in the matrix composition adhering to the substrate, particularly when applied by hand.

Solid matrices for the fabrication of the solid marking compositions e.g. for the production of pencils, crayons according to the present invention are well known in the art. They are formulated from combinations of waxes, resins, fatty acids, emollients, colorants, fillers and other additives. Different types of waxy or resinous materials can be used. Traditional crayons are based on paraffin wax and stearic acid. Plastic crayons use polyethylene resin and a plasticizer. Water soluble crayons utilize water soluble polyethylene glycol resins. The term "solid" stands for form stability of the substances forming the matrix under standard conditions (25° C., 1.013 bar, 60% humidity). The hardness of the solid matrix is best defined by the application. A smooth layer of constant uniform thickness shall adhere to a standard substrate when the marking composition is applied with a reasonable pressure exerted by a human being. As a matter of experience, pressures in the order of between 20 g and 500 g (0.2 N and 5 N) on contact surfaces in the order of between 0.05 $mm^2$ and 1 $mm^2$ are exerted on writing pens by their users. The solid matrix is formulated such that the marking composition has good lay-down properties, preferably shows no flaking and is easily used as writing instrument. The solid marking composition of the present invention can be used to produce any type of writing instruments, such as e.g. crayons, pencil leads, etc.. Lay-down is a measure of the smoothness qualities with which the solid marking composition transfers to the underlying surface. Children in particular prefer crayons having good lay-down since they make it possible to produce images, marks and drawings while exerting minimal pressure on the crayon.

The said solid matrices may contain additional coloring agents, such as dyes and/or pigments, foreseen they remain sufficiently transparent in at least part of the visible spectrum, to display said substantial viewing-angle dependent color variation. Transparency is also dependent on the thickness of the layer of the composition which is deposited on the surface of the substrate. Any optically variable interference pigment which can produce a color-shift between two colors at first and second viewing angles is suitable for the solid marking composition of the present invention. However, a preferred embodiment is a solid marking composition wherein the optically variable pigment flakes comprise an inorganic multi-layer thin film interference stack, said multi-layer stack including an opaque totally reflecting metal layer, which may optionally comprise other layers, said totally reflecting layer having a first and a second surface and at least one sequence arranged on at least one of said first and/or second surfaces of the opaque totally reflecting metal layer, said sequence comprising a dielectric layer with an index of refraction of equal or less than 1.65 and a semitransparent partially reflecting metal and/or metal oxide layer, whereby the dielectric layer of said sequence is arranged adjacent next to the opaque totally reflecting layer.

Such inorganic multi-layer interference stack can be produced by both methods i) and ii). Whereas the pigment flakes produced by method i) have a deep chroma and a strong color-shift with variation of the viewing-angle, they can show lack of chemical resistance in the surrounding medium. To the contrary the optically variable pigment flakes produced by the method ii) have a considerable chemical resistance but weaker color effects. Preferably optically variable pigment flakes are used in the present invention which have been produced by method i).

In a further preferred embodiment the multi-layer interference stack is of symmetrical design having arranged at least one of said sequences (dielectric layer and semitransparent partial reflecting layer) on both of said first and second surface of the opaque totally reflecting metal layer. Preferably the dielectric layer is of $SiO_2$ or $MgF_2$. Aluminum or aluminum alloys are the preferred metals for the totally reflecting metal layer. However, metals such as gold, silver, copper, nickel or their alloys can be used as well. The semitransparent partially reflecting layer is preferably made of chromium. However, materials such as chromium alloys, nickel, Monel or Inconel can be used, too.

In a further preferred embodiment of the present invention a solid marking composition is provided having incorporated optically variable interference pigment flakes comprising an all-dielectric structure which is formed of at least four alternating layers of at least one low refractive index material and at least one high refractive index material. A wide variety of low and high index materials known in the art can be used for the production of the said all-dielectric structure. Exemplary embodiments of such devices can be found in U.S. Pat. No. 3,858,977 (J. A. Dobrowolski et al.) and references cited therein. In particular, five-layer structures of the types $ZrO_2/Al_2O_3/ZrO_2/Al_2O_3/ZrO_2$ and $ZrO_2/SiO_2/ZrO_2/SiO_2/ZrO_2$ have been used in practice (J. A. Dobrowolski, "Optical Thin-Film Security Devices", in "Optical Document Security", $2^{nd}$ edition, R. L. van Renesse (ed.), Artech House, London, 1998). Particularly useful are combinations of titanium dioxide, zirconium dioxide or zinc sulfide for the high refractive index material with magnesium fluoride or silicon dioxide for the low refractive index material. Other high refractive materials include transition metal oxides, cerium dioxide, rare-earth sesquioxides, rare-earth trifluorides, cadmium sulfide and zinc selenide. Other low refractive materials include lithium fluoride, calcium fluoride, aluminum fluoride and cryolithe ($Na_3AlF_6$). "Low refractive index" refers to materials having an index of refraction n of less or equal than 1.65.

In another preferred embodiment, metallic particles, such as aluminum flakes, are coated by a dielectric layer of low refractive index material e.g. silicon dioxide, followed by a reflector layer of a high refractive index material such as iron(III) oxide ($Fe_2O_3$).

A further preferred embodiment is a solid marking composition wherein the optically variable interference pigment flakes comprise a liquid crystal material, preferably a polymeric cholesteric liquid crystal material.

In case the pigment flakes are of a liquid crystal type or comprise an all-dielectric multilayer structure, evidencing the color-shifting-effects may require a dark-colored or black underlying substrate.

The solid marking composition can further include optically variable interference pigments based on an all-polymer organic multi-layer foil as described in U.S. Pat. No. 3,711,176.

The matrix of the solid marking composition is defined as to include all components of the marking composition which are neither pigments nor fillers. The matrix does not contain solvents which evaporate under standard application conditions.

The matrix is in general composed of a wax or a mixture of waxes (saturated compounds) selected of the types mentioned above, i.e. paraffin waxes, stearic acid, other carboxylic acids, carboxylic acid derivatives, polyethylene resins, polyethylene glycol resins, etc. Plasticisers may be used to improve the lay-down characteristics of the matrix.

In a particular embodiment, the matrix may comprise as well un-saturated components, such as unsaturated fatty acids or derivatives thereof, and/or oxidative siccativating agents such as cobalt stearate or the like, and/or photocatalytically active compounds (sensitizers). These components allow to harden the laid-down layer by a post-treatment (fixation) by heat (melting), ultraviolet irradiation, or oxidative siccativation. Such fixation may be desirable to increase the durability (resistance) of the laid-down layer.

In the context of the present invention the term color is defined according to the CIELAB system. The terms "semitransparent", "transparent", "opaque", "totally reflecting" and "partially reflecting" all relate to light in the visible range of the electromagnetic spectrum, i.e. having wavelengths in the range of 400 nm to 700 nm.

Further part of the present invention is a writing instrument comprising the solid marking composition of the present invention. Such writing instruments have many applications. They can be used for producing effects on documents and/or to authenticate and copy-proof documents. They are useful to authenticate official signatures in order to mark it as original. Thus further part of the present invention is an optically variable marking layer, preferably for authentication purposes, providing a color-shift between two distinct colors at first and second viewing angles produced with a solid marking composition, respectively with the writing instrument of the present invention.

The solid marking composition can additionally comprise further pigments or fillers, in particular security pigments, such as luminescent or magnetic pigments. In particular, the marking composition can also comprise optically variable pigment with incorporated additional security features, such as luminescence or magnetic features, tied to the optically variable pigment's own dielectric and metallic materials. The marking composition can also comprise a plurality of different optically variable pigments.

The solid marking composition can in particular comprise forensic marking compounds and particles, as described in WO9934315 and U.S. Pat. No. 6,200,628.

The solid marking composition according to the invention can be applied to any substrate by all of the methods known in the art for applying such compositions. Part of the present invention is further the use of a plurality of optically variable pigment flakes in particular in a writing instrument for producing hand written preferably anti-counterfeitable markings on documents.

The solid, abrasion-depositable marking composition according to the invention is further illustrated with the help of the figures and of the following formula examples.

FIG. 1: depicts schematically the object of the invention

Figure 2:
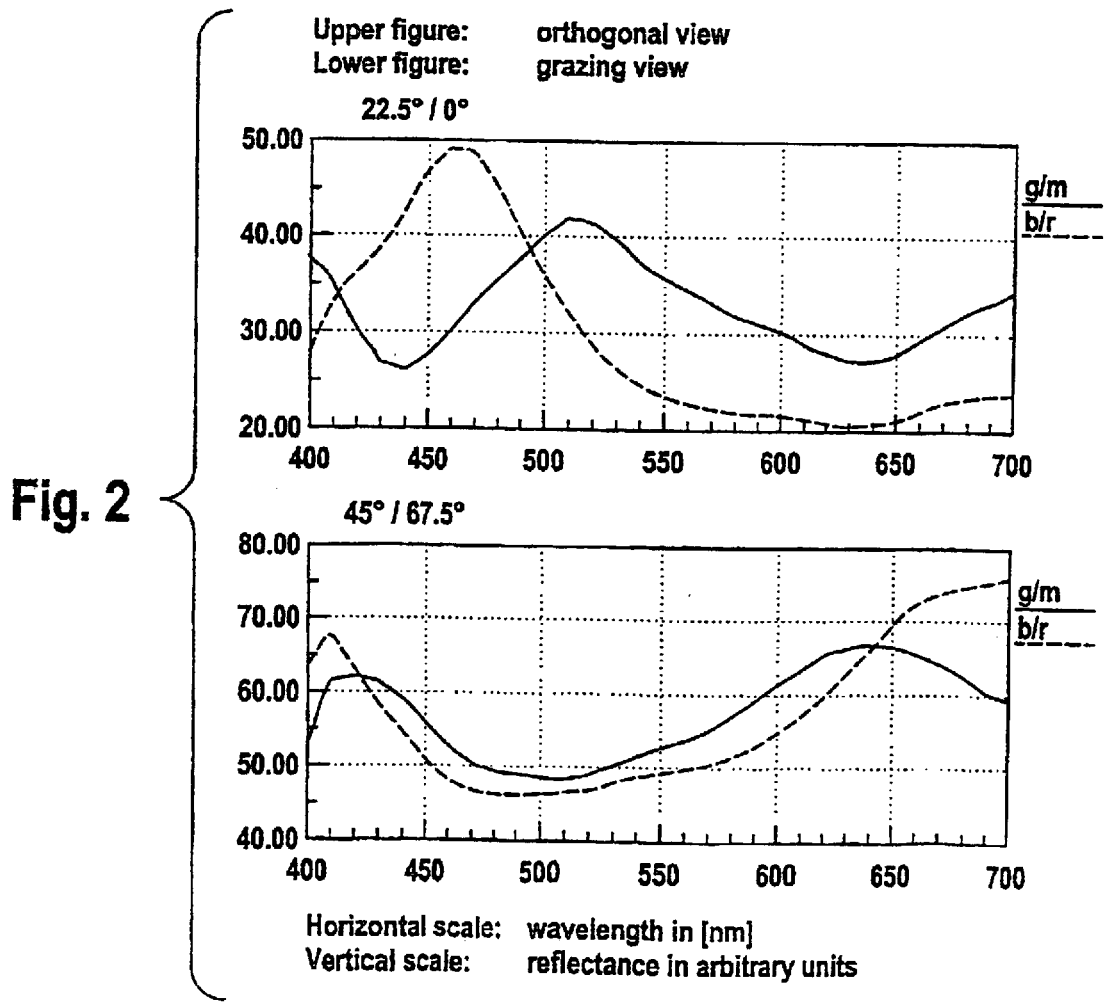

FIG. 2: shows the spectral response curves of a paper surface coated with green-to-magenta and blue-to-red OVP-crayons prepared according to example 1 given below, such as obtained.

Figure 3:
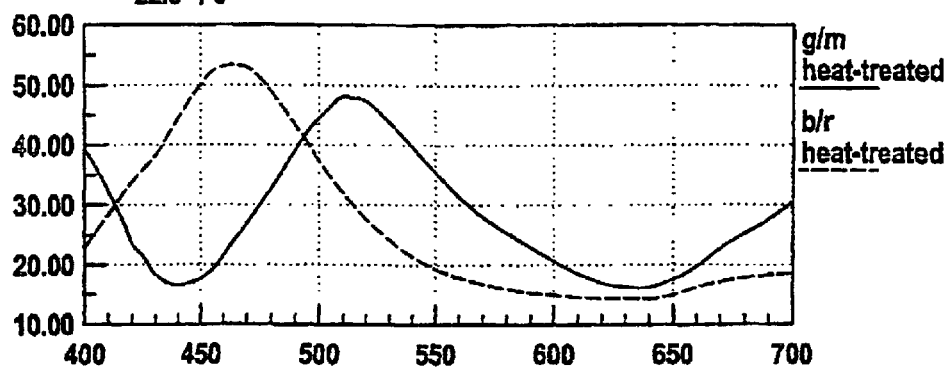
Figure 3:
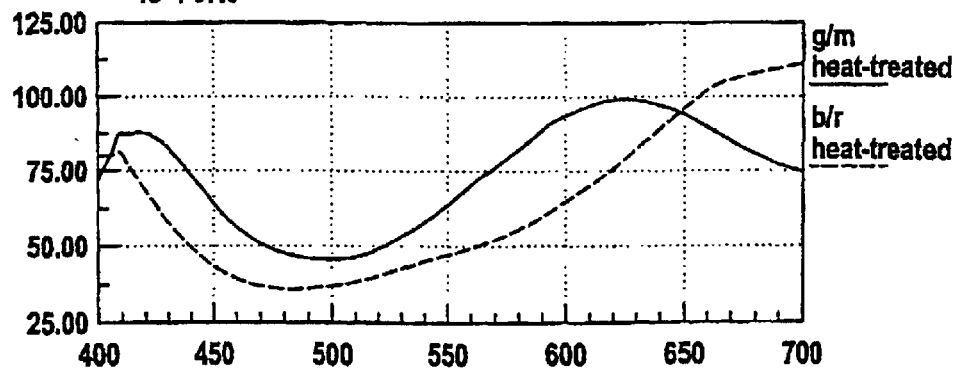

FIG. 3: shows the spectral response curves of a paper surface coated with green-to-magenta and blue-to-red OVP-crayons prepared according to example 1 given below, after a short heat treatment, such as might be required for permanent fixation of a hardenable (cross-linkable) embodiment of the composition according to the invention.

EXAMPLES

In all examples, the formula components were thoroughly mixed together at 80° C. to yield a paste, which was formed into elongated cylinders, to be used as a crayon-lead, and subsequently cooled to ambient temperature. The resulting solid crayon leads were used to write on paper, fabric, wood, metal and plastic materials.

Example 1

(Elementary Formula)

| | |
|---|---|
| 5.0 g | stearic acid |
| 5.0 g | OVP green/magenta (FLEX Products Inc., Santa Rosa, CA) flaky optically variable pigment (viewing angle dependent color shift green-to-magenta), produced by physical vapour deposition on a flexible web. |

Example 2

(Formula with Luminescent Pigment)

| | |
|---|---|
| 4.0 g | stearic acid |
| 1.0 g | Carnauba wax |
| 1.0 g | Castor oil |
| 5.0 g | OVP ED 1821 (BASF) optically variable interference pigment produced by wet chemical coating of flattened aluminum particles with a dielectric layer of $SiO_2$, followed by chemical vapour deposition in fluidized bed of a reflector layer of $Fe_2O_3$. |
| 1.0 g | Lumilux Green CD 140 (Honeywell Specialty Chemicals, Seelze, GmbH) UV to green luminescent pigment |

Example 3

(Formula with Magnetic Pigment)

| | |
|---|---|
| 4.0 g | stearic acid |
| 2.0 g | low melting paraffin wax |
| 3.0 g | OVP green/magenta (FLEX Products Inc., Santa Rosa, CA) flaky optically variable pigment (viewing angle dependent color shift green-to-magenta), produced by physical vapour deposition on a flexible web. |
| 2.0 g | OVP ED 1821 (BASF) optically variable interference pigment produced by wet chemical coating of flattened aluminum particles with a dielectric layer of $SiO_2$, followed by chemical vapour deposition in fluidized bed of a reflector layer of $Fe_2O_3$. |
| 1.0 g | magnetic oxide B-350 M (MAGNOX) |

Example 4

(Formula with IR Luminescent Pigment)

| | |
|---|---|
| 4.0 g | stearic acid |
| 1.0 g | polyethylene glycol 17'500 (Fluka) |
| 3.0 g | OVP (Wacker Chemie SLM 41101 green-to-blue) optically variable interference pigment flakes comprising polymeric cholesteric liquid crystal material |
| 1.0 g | $YVO_4$:Nd (Honeywell Specialty Chemicals, Seelze, GmbH; IR-CD 139) |

Example 5

(Formula with Forensic Coding Pigment)

| | |
|---|---|
| 4.0 g | stearic acid |
| 5.0 g | OVP green/blue (FLEX Products Inc., Santa Rosa, CA) flaky optically variable pigment (viewing angle dependent color shift green-to-blue), produced by physical vapor deposition on a flexible web. |
| 0.1 g | $(Y_{1.0}Nd_{0.3}Gd_{0.4}Er_{0.2}Yb_{0.1})$ $O_2S$ forensic coding material according to WO9934315. |

Example 6

(Formula with Magnetic OVP)

| | |
|---|---|
| 2.0 g | stearic acid |
| 2.5 g | OVP green/blue magnetic (FLEX Products Inc.) optically variable pigment flakes with viewing angle dependent color shift green-to-blue, produced by physical vapor deposition on a flexible web, having magnetic nickel as the totally reflecting layer. |

Example 7

(Formula with Luminescent OVP)

| | |
|---|---|
| 4.0 g | stearic acid |
| 5.0 g | OVP green-to-blue luminescent optically variable pigment, produced by physical vapor deposition, having a metal-dielectric-metal layer sequence comprising a $LaF_3$ layer, doped with europium (III) ions, as part of the dielectric layer. |

Two compositions, prepared according to formula example 1 given above, and containing, respectively, green-to-magenta (g/m) and blue-to-red (b/r) optically variable pigment of type (i), were used to apply indicia on paper. The optical parameters and spectra (FIG. 2) of the so coated surfaces were measured using a two-angle colorimeter manufactured by PHYMA.

The CIELAB color parameters were measured at near orthogonal observation angle (illumination at −22.5°; observation at 0°) and at near grazing observation angle (illumination at −45°; observation at +67.5°). The angles refer to the normal to the plane of the paper, and minus and plus signs indicate opposite directions with respect to the normal in a plane orthogonal to the plane of the paper. Illumination and observation angles were chosen slightly different, in order to avoid specular reflection condition.

The chroma (C*) and hue (h*) values obtained are a quantitative expression of the visually perceived color change:

| | C* | h* |
|---|---|---|
| g/m (−22.5°/0°) | 14.4 | 153.7 |
| g/m (−45°/67.5°) | 10.4 | 354.4 |
| b/r (−22.5°/0°) | 23.2 | 265.4 |
| b/r (−45°/67.5°) | 9.9 | 351.2 |

It is thus evidenced that simple writings applied on paper using the solid marking composition of the present invention show pronounced angle-dependent color change.

The same samples were also subjected to a short post-treatment with heat (100° C. for about 10 seconds), in order to simulate the effect of a post-fixation step, which can be designed such as to result in a crosslinking of the binder, to render the applied indicia indelible, i.e. resistant to solvents, laundry, etc.

The CIELAB parameters and the spectra were measured again at the same angles (FIG. 3). The following chroma and hue values were obtained:

|  | C* | h* |
|---|---|---|
| g/m (−22.5°/0°) | 35.7 | 155.5 |
| g/m (−45°/67.5°) | 25.8 | 6.5 |
| b/r (−22.5°/0°) | 31.6 | 258.0 |
| b/r (−45°/67.5°) | 23.3 | 10.9 |

The heat treatment introduced a slight change in the hue values (please note that the h* values are cyclic in 360°), but it did not change the substantial perception of the colors and of the color changes. It is thus confirmed that mere solid-abrasion of a solid coating composition results in a sufficient alignment of the optically variable pigment flakes, such as to allow for the use of solid-abrasion coating compositions (crayons) as an easy, hand-applicable anti-copy means.

What is claimed is:

1. A solid marking composition for use in a writing tool for producing a hand-written anti-counterfeit marking on a substrate, said composition comprising
   a solid matrix and
   at least one type of optically variable pigment which shows substantial viewing-angle dependent color variation,
   wherein the marking composition is abradable, to deposit during writing a layer of the composition, including said pigment, on said substrate, to create a marking having viewing-angle dependent color variation.

2. A composition according to claim 1, wherein said pigments are flat, thin-film interference pigments having an aspect ratio of at least 2:1.

3. A composition according to claim 1, wherein said pigments are flat, thin-film interference pigments having an aspect ratio of at least 5:1.

4. A composition according to claim 1, wherein said matrix is sufficiently transparent in at least part of the visible spectrum to display said substantial viewing-angle dependent color variation.

5. A solid marking composition according to claim 1, wherein the optically variable pigments comprise
   an inorganic multi-layer thin film interference stack, said multi-layer stack including
   an opaque, totally reflecting metal layer having a first and a second surface and
   at least one sequence arranged on at least one of said first and second surfaces of the opaque, totally reflecting metal layer, said sequence comprising
   at least one dielectric layer with an index of refraction of less or equal than 1.65 and
   a semitransparent partially reflecting metal or metal oxide layer,
   the dielectric layer of said sequence being disposed adjacent the opaque totally reflecting layer.

6. A composition according to claim 5, wherein said opaque, totally reflecting metal layer comprises further layers.

7. A solid marking composition according to claim 5, wherein the multi-layer interference stack is symmetrical, having at least one of said sequences on both said first and said second surface of the opaque totally reflecting layer.

8. A solid marking composition according to claim 7, wherein said opaque totally reflecting metal layer is completely surrounded by at least one of said sequences.

9. A solid marking composition according to claim 1, wherein said optically variable pigment comprises an inorganic all-dielectric multi-layer thin-film interference stack, said stack comprising at least four layers of adjacently different dielectric materials.

10. A solid marking composition according to claim 1, wherein the optically variable interference pigments comprise a liquid crystal material.

11. A solid marking composition according to claim 1, wherein the optically variable interference pigment is an all-polymer organic multi-layer foil.

12. A solid marking composition according to claim 1, wherein the solid matrix comprises a wax selected from the group consisting of paraffin waxes, carboxylic acids, stearic acid, carboxylic acid derivatives, Carnauba wax, polyethylene resins and polyethylene glycol resins, and mixtures thereof.

13. A solid marking composition according to claim 1, wherein the solid matrix comprises components selected from the group consisting of unsaturated fatty acids and derivatives thereof, oxidizing siccative agents, and photocatalytically active compounds (sensitizers).

14. A solid marking composition according to claim 1, further comprising at least one additional security pigment.

15. A solid marking composition according to claim 14, wherein the additional security pigment is a luminescent pigment.

16. A solid marking composition according to claim 14, wherein the additional security pigment is a magnetic pigment.

17. A solid marking composition according to claim 1, wherein the optically variable pigment has luminescent properties.

18. A solid marking composition according to claim 1, wherein the optically variable pigment has additionally magnetic properties.

19. A writing instrument comprising a solid marking composition according to claim 1.

20. An optically variable marking layer for authentication purposes, providing a color-shift between two distinct colors at first and second viewing angles, said marking being produced with a solid marking composition according to claim 1.

21. A composition according to claim 1, wherein said solid matrix further comprises additional coloring agents.

22. A method of using a solid, abrasion-depositable marking composition means comprising a solid, abrasion-removable matrix and at least one type of optically variable pigment which shows substantial viewing-angle dependent color variation for creating a marking having a viewing-angle dependent color variation comprising the step of
   depositing a layer of the composition, including said pigment, on a surface of a substrate.

* * * * *